No. 667,896. Patented Feb. 12, 1901.
F. A. STROETER.
SMOOTHING MACHINE.
(Application filed Sept. 1, 1900.)

(No Model.)

Witnesses:
J. K. Becker
W. G. Paine

Inventor.
Frederick A. Stroeter
By O. D. Lewis
Att'y.

UNITED STATES PATENT OFFICE.

FREDRICK A. STROETER, OF ROCHESTER, PENNSYLVANIA.

SMOOTHING-MACHINE.

SPECIFICATION forming part of Letters Patent No. 667,896, dated February 12, 1901.

Application filed September 1, 1900. Serial No. 28,834. (No model.)

*To all whom it may concern:*

Be it known that I, FREDRICK A. STROETER, a citizen of the United States of America, residing at Rochester, in the county of Beaver and State of Pennsylvania, have invented certain new and useful Improvements in Smoothing-Machines; and I do hereby declare the following to be a full, clear, and exact description thereof, reference being had to the accompanying drawings, which form a part of this specification.

This invention relates to an improved machine for grinding and truing the ends of electric-light globes; and it consists in the certain details of construction and combination of parts, as will be fully described hereinafter.

Figure 1:
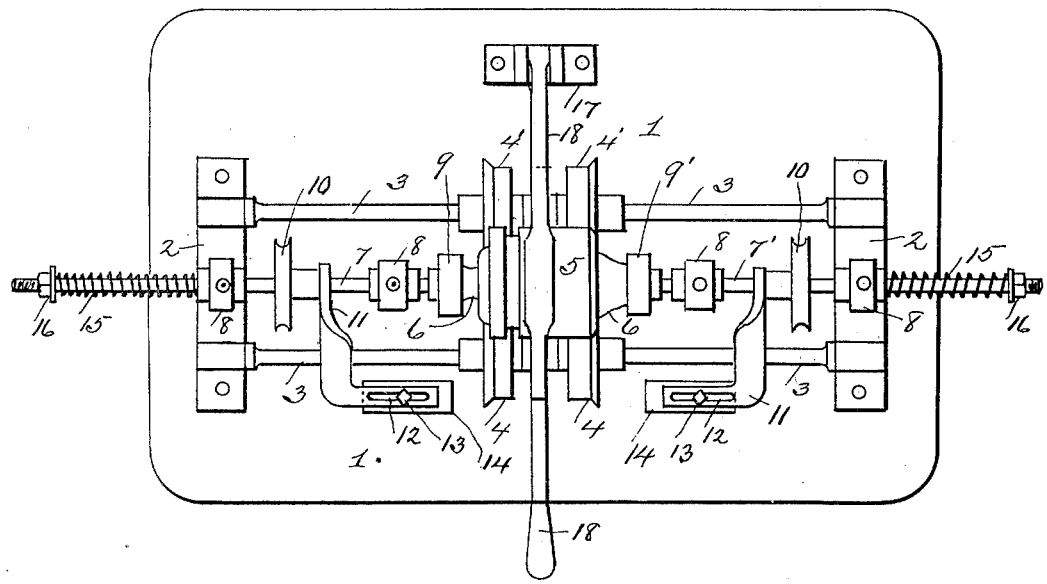
Figure 2:
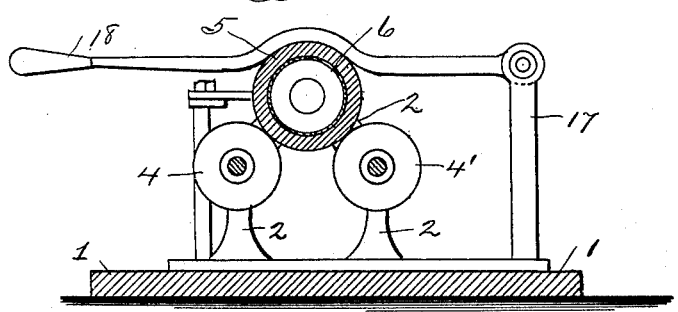
Figure 3:
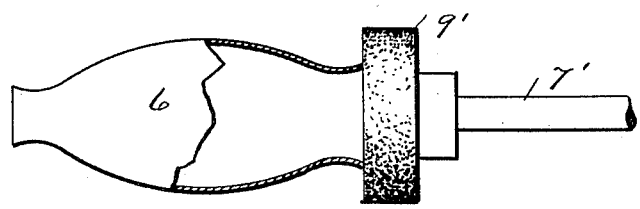

In the accompanying drawings, Figure 1 is a plan view of my improved machine for grinding the ends of electric-light globes, the same being constructed and arranged in accordance with my invention. Fig. 2 is an end sectional elevation of the same, the said section being taken about the center of the machine. Fig. 3 is an enlarged side elevation of an electric-light globe, a part of which is in section, and showing one of the grinding-stones in contact with one end thereof.

To construct an apparatus in accordance with my invention, I provide a bed-plate 1 of a suitable size and form and mount thereon in proper bearings 2 two shafts 3, the one parallel and in line with the other. Each of these shafts 3 is fitted with roller-bearings 4 4' for the purpose of supporting a chuck 5, capable of holding the globe 6 to be operated upon. Arranged intermediate of the two shafts 3 and at a higher elevation are two drive-shafts 7 7', each of which is mounted in bearings 8, and the said shafts are capable of endwise movement for a limited distance in their bearings. Each of these shafts 7 7' is fitted with a driving-pulley 10 and each provided with a spiral spring 15, bearing against suitable stops 16, connected to the ends of the said shafts, the said springs tending to move the shafts the one toward the other. Fitted to the inner end of each of these shafts 7 and 7' are grinding-stones 9 and 9', arranged to grind the ends of the globe 6, placed in the chuck 5. To form an adjustable stop to limit the throw of the two shafts 7 and 7', two slotted arms 11 are placed in a position to intercept the hubs of the drive-pulleys 10 and the said arms provided with binding-screws 12. Pivoted in a bearing 17 at the rear of the machine is a lever 18, which projects over the chuck 5 and is used to place a pressure upon the said chuck to create a frictional contact with the rollers 4 4' and to hold the chuck in position.

In operation the globe 6 to be operated upon is placed in the chuck 5 and the said chuck arranged upon the rollers 4 and 4' and the lever 18 brought to the position shown at Fig. 2 of the drawings. The two stones 9 and 9' are given a rapid rotary movement by power applied to the pulleys 10, the springs keeping the stones 9 and 9' in contact with the ends of the globe, and by reason of the rotatable movement of the same rapidly grinds the ends of the globe, and the stones moving inward until stopped by the arms 11 will finish all globes the same length.

By the use of a machine constructed as described the globes are accurately formed, both as to length and even parallel ends.

Various slight modifications and changes may be made in the details of construction without departing from the spirit of the invention. Therefore I do not confine myself to the exact construction shown and described.

Having thus described my invention, what I claim, and desire to secure by Letters Patent, is—

The herein-described machine for grinding the ends of electric-light globes, consisting of the rollers mounted upon suitable shafts, for the purpose of supporting a suitable chuck, the chuck 5 for holding the globe, the lever 17 for holding the chuck, the two shafts 7 and 7' arranged in line with the chuck, the grinding-stones mounted upon the inner ends of the shafts 7, 7', the driving-pulleys 10 for operating the shafts, the springs 15 to project the shafts inward, and the adjustable stops 11, for limiting the movement of the grinding-stones, all arranged and combined for service, substantially as and for the purpose described.

In testimony whereof I have hereunto affixed my signature in the presence of two subscribing witnesses.

FREDRICK A. STROETER.

Witnesses:
H. E. BEESER,
JOHN GROETZINGER.